US006408296B1

United States Patent
Acharya et al.

(10) Patent No.: US 6,408,296 B1
(45) Date of Patent: Jun. 18, 2002

(54) COMPUTER IMPLEMENTED METHOD AND APPARATUS FOR ENHANCING ACCESS TO A FILE

(75) Inventors: Swarup Acharya, New Providence, NJ (US); Henry F. Korth, Lower Gwynedd, PA (US); Viswanath Poosala, Highland Park, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/328,606

(22) Filed: Jun. 9, 1999

Related U.S. Application Data

(60) Provisional application No. 60/098,678, filed on Sep. 1, 1998.

(51) Int. Cl.$^7$ ............................................... G06F 17/30

(52) U.S. Cl. ..................... 707/10; 707/102; 709/218

(58) Field of Search ..................... 707/10, 102, 513, 707/533; 709/218; 712/29; 370/231, 392, 395, 466, 468

(56) References Cited

U.S. PATENT DOCUMENTS

| | | | | |
|---|---|---|---|---|
| 5,282,207 A | * | 1/1994 | Jurkevich et al. | 370/468 |
| 5,764,235 A | | 6/1998 | Hunt et al. | 700/501 |
| 6,035,330 A | * | 3/2000 | Astiz et al. | 709/218 |
| 6,061,783 A | | 5/2000 | Osaku | 709/245 |
| 6,253,204 B1 | * | 6/2001 | Glass et al. | 707/102 |

OTHER PUBLICATIONS

Ixite Link Check a software for fixing borken links, by IXACTA Visual Software pp. 1–4 (1997–2000); httpL//www.com/link–checker.html.*

A reconfiguration algorithm for double loop token ring local area network by R. Rom et al., IEEE publication, pp. 182–189, vol. 37. No. 2 (Feb. 1988).*

"Cost–Aware WWW Proxy Caching Algorithms", Pai Cao and Sandy Irani, Technical Report CS–TR–97–1343, University of Wisconsin, Madison, May 1997.

"Adapting to Network and Client Variability Via On–Demand Dynamic Distallation", Armando Fox, Steven D. Gribble, Eric A. Brewer and Elan Emir, In Proceedings of the Seventh International Conference on Architectural Support for Programming Languages and Operating Systems, pp. 160–170, Cambridge, Massachusetts, Oct. 1–5, 1996. ACM SIGARCH, SGIOPS, SIGPLAN, and the IEEE Computer Society.

Fast Approximate Answers to Aggregate Queries on a Data Cube, Viswanath Poosala and Venkatesh Ganti, Submitted for Publication, 1997.

"Exploring Bounds of Web Latency Reduction from Caching and Prefetching", T. Kroeger, D. Long and J. Mogul, USENIX Symposium on Internet Technologies and Systems, 1998.

(List continued on next page.)

*Primary Examiner*—Diane D. Mizrahi
(74) *Attorney, Agent, or Firm*—Synnestvedt & Lechner LLP

(57) ABSTRACT

A computer implemented method and apparatus for enhancing access to a file and communicating a file over a communications network using an indirect link. An indirect link is a logical hyperlink identifying a file to be retrieved, not by its electronic address, but by a logical representation. The link may denote the server on which the file exists, but does not identify the file's full address. Rather, the server or a proxy machine uses a look-up table which relates a logical link to an actual electronic address. This system helps minimize broken links, since a file can still be located on the server and accessed even if it has been relocated on the server since the link was established.

16 Claims, 2 Drawing Sheets

OTHER PUBLICATIONS

"Quality Controlled Compression of Sets of Images", Miron Livny and Viresh Ratnakar, MMDBMS '96, 1996.

"System–Wide Multiresolution" R. L. Read, D. S. Fussell and A. Silberschatz, Technical Report TR–93–04, The University of Texas at Austin, Department of Computer Sciences, Feb., 1993.

"Scenarios for the Delivery of Negotiated Content", Edward Hardie, NASA NIC, Downloaded from the World Wide Web @ http://www.ietf.org prior to May 1998.

"Ericsson Speeds Up Wireless Web Browsing" Business Wire, May 18, 1999.

* cited by examiner

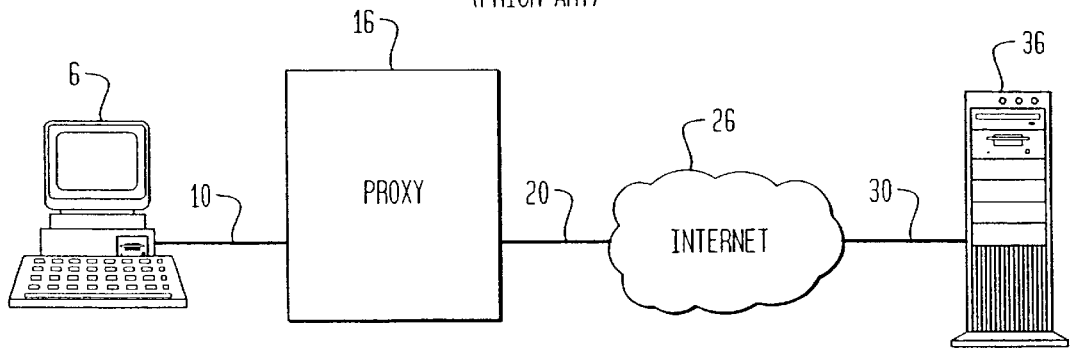

NetBlitz Publications

- NetBlitz: A Novel Solution to "World-Wide Wait", S. Acharya, H. Korth and V. Poosala.
  (letter+figures, letter-figures, A4+figures, A4-figures)

- Systematic Multiresolution and Its Application to the WWW, S. Acharya, H. Korth and V Poosala.
  (letter+figures, letter-figures, A4+figures, A4-figures)

- Using Multiresolution-aware Cache Management to Improve Web Performance, S. Acharya, H. Korth and V. Poosala.
  (letter+figures, letter-figures, A4+figures, A4-figures)

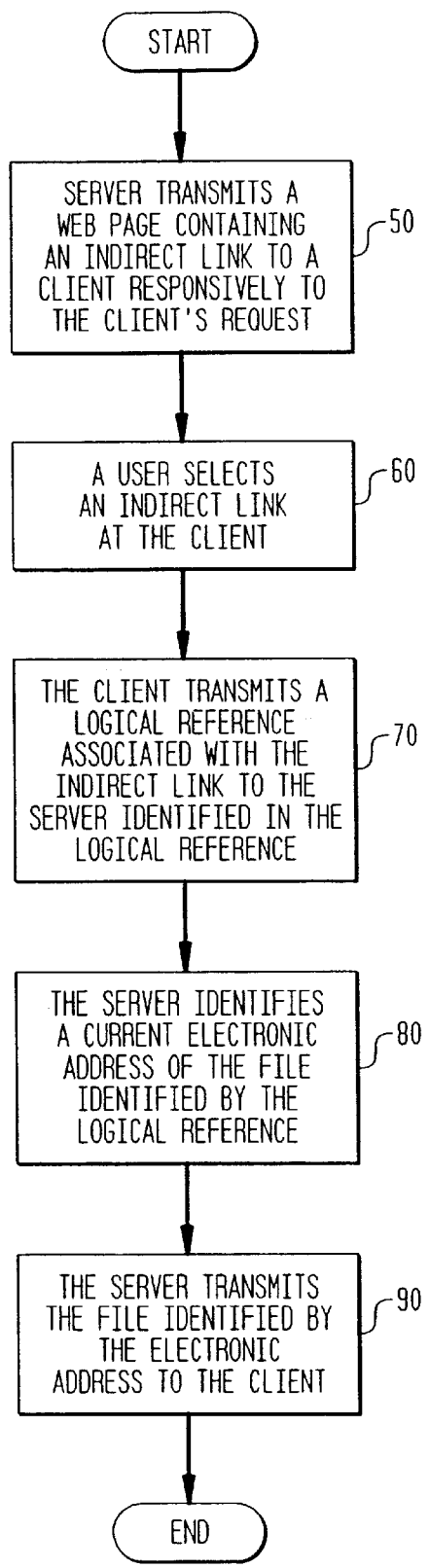

COMPUTER IMPLEMENTED METHOD AND APPARATUS FOR ENHANCING ACCESS TO A FILE

RELATED APPLICATION

This application claims the benefit of U.S. Provisional Application No. 60/098,678, filed Sep. 1, 1998.

FIELD OF THE INVENTION

This invention relates to communications networks, generally, and more particularly to a method of communication within such communications networks and apparatuses for practicing the inventive method.

BACKGROUND OF THE INVENTION

The World Wide Web ("Web") is essentially a distributed depository of data files stored on Web servers connected by a global communications network known as the Internet. Users of the Web may request transmission of files to their own computers, i.e., Web clients, for viewing, storing or printing. Each Web server stores files identified by a universal resource locator (URL) comprising an electronic address. Each URL is a physical reference in that each URL points to a particular server and identifies the location of a single file at that server. Many of the files stored on Web servers are documents written in a standard programming language known as hypertext mark-up language (HTML). The standard HTML syntax of Web pages and the standard HTTP communications protocol supported by the Web guarantee that a Web client and Web browser can communicate with any Web server. The JAVA programming language and JAVA applets allow for platform independent application programs which can be executed by any Web client.

HTML files are translated for viewing, printing or storing by a Web browser computer program running on the Web clients. The Web browser also communicates with Web servers. Using HTML, an author of such a Web page (a file written in HTML) can designate a specific word, phrase or image in the Web page as a hyperlink. Each hyperlink may be associated with a URL of another Web file. A user's selection of a hyperlink is an initiation of a request for the file located at the electronic address identified by the URL with which the hyperlink is associated. Since each traditional hyperlink is associated with a single URL, each hyperlink is associated with a single file having a particular location on a particular server.

A request for transmission of a file originates at the Web client and is submitted to a Web server by the Web browser software running on the Web client. In a typical arrangement, the request is then forwarded to a proxy computer interconnecting the client computer and the server computer. Upon a user's selection of a hyperlink, the client's Web browser issues a hypertext transfer protocol (HTTP) request to the Web server identified by the URL associated with the hyperlink. The request is intercepted by a proxy which then relays the request over the Internet to the identified Web server. The Web server responds by transmitting the requested file to the proxy, assuming that the requested file resides on the Web server at the electronic address identified in the URL. The proxy then relays the requested file to the Web client.

If the Web server does not have the requested file at the electronic address identified in the URL, the Web server transmits an error message to the Web client and the client does not receive the requested file. In such a case, the hyperlink associated with the incorrect URL is referred to as a "broken link". This frequently occurs, for example, when a Web page is written such that a hyperlink is established to a file having a particular electronic address on a server and the file is subsequently deleted from or moved relative to the server. If the Web page is not updated to revise the URL associated with the hyperlink to reflect the file's current electronic address, a broken link results.

SUMMARY OF THE INVENTION

Accordingly, it is an object of the present invention to enhance access to a file and reduce the problem of broken links by providing a method for satisfying a request for information which identifies a file independently of its location on a particular server.

It is another object of the present invention to provide such a method which is compatible with existing communication protocol, and Web browsers.

It is yet another object of the present invention to provide apparatuses for carrying out the inventive method.

These and other objects are realized by the provision of a system for transmitting files over a communications network in which links, such as hyperlinks, to files comprise a new construct herein termed an indirect link. An indirect link is a logical link identifying a file to be retrieved, not by its electronic address or URL, but by a logical reference. The logical reference may identify the server on which the file exists, but does not identify the file's complete electronic address, i.e., an identification of a particular server and the file's location on that server. Rather, the server or a proxy computer uses a look up table which relates the logical reference to an actual current electronic address at the server containing that file. The use of indirect links helps minimize the occurrence of broken links, since a file can be moved from the location at which it existed when a hyperlink to it was created, yet still be retrieved from the server. If a regular hyperlink of the prior art had been used, once the file had been moved from the electronic address (e.g., URL) to which the hyperlink pointed, the file could not be retrieved through that hyperlink.

DESCRIPTION OF THE DRAWINGS

FIG. 1 is a symbolic diagram of a simplified World Wide Web topology as known in the prior art.

FIG. 2 is an image of an example of a Web page which shows hyperlinks in accordance with the prior art.

FIG. 3 is a symbolic diagram illustrating communication in accordance with the present invention using an indirect link.

DETAILED DESCRIPTION

The present invention relates to a method of communication in a communications network and apparatus for carrying out the inventive method. FIG. 1 is a symbolic diagram of a simplified Web topology as is known in the prior art. In the example of FIG. 1, the Web client 6 is the user's computer. The client 6 may connect to an Internet Service Provider (not shown) over a communications line 10, using a modem in the client 6. The Internet Service Provider typically controls the proxy 16 which has a dedicated connection over a transmission link 20 to the Internet 26, a sub-network of switching nodes and transmission links. A Web server 36 is connected to the Internet 26 by a transmission link 30. In actuality, the Web's topology is much more complex with numerous servers, clients, proxies, transmission links, etc.

Using Web browser software running on the Web client, the user requests an image, document, multimedia or other data file (any content-based file being herein referred to collectively as a "file") by selecting a hyperlink examples of which are shown in FIG. 2. Upon selection of a hyperlink, the user's Web client 6 submits a request to a server 36 identified in the URL associated with the selected hyperlink. In a typical Web topology, the URL is transmitted to the proxy 16 over link 10 using the GET URL HTTP request, which then forwards it over transmission link 20 to the Web server via the Internet 26 and transmission link 30. The Web server 36 responds to the request by transmitting the file identified in the URL via the Internet 26 to the proxy 16 which then forwards the file to the client 6 for viewing, storing or printing.

The present invention provides a method and apparatus for satisfying a request for transmission of a file, the request initiating with a user's selection of a logical link, i.e., a logical point of access to a file. The logical point of access is associated with a logical reference. This logical reference is later paired with a physical reference, i.e., an electronic address at which the requested file is, or should be, located. The logical point of access is referred to herein as an "indirect link".

A traditional hyperlink is written in HTML to associate the hyperlink with a single file having a particular electronic address. The particular server and the file's location relative to that server are specified in the URL associated with the hyperlink. Accordingly, when a file having a particular filename is deleted from the server specified in the URL or is moved to a different location on the server, selection of the hyperlink associated with the file will result in display of an error message rather than display of the requested file, i.e., a broken link.

An indirect link, on the other hand, is associated with a logical reference to a file, rather than with an actual electronic address at which the file might be found. The use of indirect links is implemented by associating an indirect link with a logical reference which uniquely identifies a file independently of the file's location on a server. While the logical reference may take any form, it is preferable that the logical reference be similar to the current format of a traditional URL. For example, a logical reference associated with an indirect link may have the format:

http://www.bell-labs.com/user/mypapers

This is an indirect link to a file identified as mypapers. It is simply a name for a file or group of files and it encapsulates no physical location information of the file relative to the server specified in the logical reference. In fact the file associated with this logical reference may change over time.

Upon selection of the indirect link, the client transmits the logical reference to the server identified in the logical reference associated with the indirect link using the GET URL request. The server maintains a look-up table which stores the mapping of every logical reference exported from the server to its current physical location (i.e., electronic address) on the server. When the server receives the logical reference, it checks the look-up table to determine the current electronic address of the file and then retrieves and transmits the file to the client in the usual fashion.

By disassociating the electronic address of the file from the indirect link, and maintaining a look-up table associating each logical reference to a file with the file's current electronic address, the broken link problem is greatly reduced. Broken links will occur only when the look-up table is out of date. The use of indirect links is particularly advantageous with respect to bookmarks, since the desired file will be returned to the client upon selection of the bookmark even if the file is moved on the server subsequent to bookmarking the indirect link.

In accordance with the present invention, the use of an indirect link is shown in the flowchart of FIG. 3 and described below. In step 150, a Web server first transmits a Web page containing an indirect link to a client responsive to the client's request for the Web page. In step 160, the user then selects an indirect link from the Web page as displayed in the browser. In step 170, the client then transmits the logical reference associated with the indirect link to the server identified in the logical reference. In step 180, the server then checks a look-up table and identifies a current electronic address of the file identified by the logical reference. In step 190, the server transmits the file identified by the electronic address to the client in the usual fashion.

It should be noted that the indirect link concepts may be combined with other concepts to derive even more powerful hyperlinks. For example, an indirect link may be combined with a multilink (U.S. patent application Ser. No. 09/328,607, filed concurrently herewith, describes such multilinks). Accordingly, an indirect multilink may be constructed wherein one or more of the individual URLs associated with the multilink are indirect link logical references. In such an arrangement, in the context of the example above, the files associated with the mypapers logical reference may change over time, as well as each file's location.

Accordingly, an indirect multilink may be constructed wherein one or more of the individual URLs associated with the multilink are indirect link logical references. In such an arrangement, in the context of the example above, the files associated with the mypapers logical reference may change over time, as well as each file's location.

In accordance with this indirect link framework, electronic addresses identifying the location of files on servers need never be exported to any client computers. This ensures avoidance of the broken link problem, provided that the server's look-up table is updated to reflect any changes in location of files associated with the indirect links.

It should also be noted that, although an indirect link logical reference is most useful in association with a hyperlink, such a logical reference may be advantageously used independently of a corresponding hyperlink, e.g., for references to images or other files, embedded in a Web page. For example, a file identified by an indirect link logical reference which is embedded in a Web page is automatically requested by the client (Web browser) in the process of loading the Web page for display at the client.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of operation of a server computer connected to a client computer by a communications network, the method comprising the steps of:

(a) receiving from the client computer, at the server computer, a logical reference uniquely identifying a file independently of an electronic address at which the file is located;

(b) determining, at the server computer, an electronic address corresponding to the logical reference; and (c) transmitting, from the server computer, the file identified by the electronic address.

2. The method of claim 1, wherein the logical reference further identifies the server computer independently of an electronic address at which the file is located.

3. The method of claim 2, wherein step (b) comprises reference to a look-up table listing the logical reference and a corresponding electronic address of the file to determine the electronic address of the file corresponding to the logical reference.

4. The method of claim 3, wherein step (c) comprises retrieval of a file from a location identified by the current electronic address.

5. A computer for transmitting a file to a client computer over a communications network responsive to a request from the client computer, said computer comprising:

a memory for storing computer programs and files;

a first computer program for determining an electronic address corresponding to a logical reference to the file received from a client computer;

a second computer program for transmitting the file to the client computer.

6. The computer of claim 5, further comprising a look-up table disclosing electronic addresses of files corresponding to logical references to those files wherein the first computer program comprises:

a routine for referencing the look-up table to determine a current electronic address of the file corresponding to the logical reference.

7. The computer of claim 6, wherein the computer is a server computer connected to the network.

8. The computer of claim 6, wherein the computer is a proxy computer connected to the network.

9. A server computer configured to determine an electronic address of a file upon receipt from a client computer of a logical reference to the file, the logical reference identifying the server computer and uniquely identifying the file associated with the logical reference independently of an electronic address at which the file is located, the server computer being further configured to transmit the file identified by the electronic address to the client computer responsive to receipt of the logical reference.

10. A method of communication between a client computer and a server computer connected to the client computer by a communications network, the method comprising the steps of:

(a) requesting, at the client computer, a file identified by a logical reference uniquely identifying the file independently of an electronic address at which the file is located;

(b) identifying an electronic address corresponding to the logical reference; and (c) receiving, at the client computer, the file identified by the logical reference.

11. The method of claim 10, further comprising the step of:

(d) transmitting the logical reference from the client computer to the server computer, step (d) being performed intermediate steps (a) and (b).

12. The method of claim 11, wherein the identifying step is performed at the server computer.

13. The method of claim 12, wherein the logical reference is transmitted in step (d) responsive to a user's selection, at the client computer, of an indirect link.

14. The method of claim 12, wherein the logical reference is transmitted in step (d) automatically, in the process of loading a Web page containing an embedded logical reference.

15. The method of claim 1, wherein the logical reference is received in step (a) responsive to a user's selection at the client computer, of an indirect link.

16. The method of claim 1, wherein the logical reference is received in step (a) automatically, in the process of loading a Web page containing an embedded logical reference.

* * * * *